US011287569B1

(12) United States Patent
Soo et al.

(10) Patent No.: US 11,287,569 B1
(45) Date of Patent: Mar. 29, 2022

(54) RUGGEDIZED SYSTEM AND METHOD FOR HIGH-SPEED IMAGING OF EXPLOSIVELY GENERATED FLOW

(71) Applicant: The United States of America as Represented by the Secretary of the Navy, Indian Head, MD (US)

(72) Inventors: Michael Soo, Alexandria, VA (US); Meghan Bash, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/300,028

(22) Filed: Feb. 17, 2021

(51) Int. Cl.
*G02B 6/06* (2006.01)
*H04N 5/225* (2006.01)

(52) U.S. Cl.
CPC ........... *G02B 6/06* (2013.01); *H04N 5/22521* (2018.08)

(58) Field of Classification Search
CPC .............................. G02B 6/06; H04N 5/22521
See application file for complete search history.

(56) References Cited

U.S. PATENT DOCUMENTS

| 3,514,351 | A | 5/1970 | Mukai | |
| 4,815,816 | A * | 3/1989 | Schneider | .......... A61B 1/00096 |
| | | | | 250/227.2 |
| 6,091,872 | A | 7/2000 | Katoot | |
| 6,524,237 | B1 | 2/2003 | McGowan | |
| 9,894,254 | B2 | 2/2018 | Dehkordi et al. | |
| 2010/0182405 | A1* | 7/2010 | Monteiro | ................. G02B 6/04 |
| | | | | 348/45 |

OTHER PUBLICATIONS

McNesby et al., "Imaging Detonations of Explosives", Apr. 2015, U.S. Army Research Laboratory, United States, 30 pages. (Year: 2015).*
Lebel et al., "Measurements of the Temperature Inside an Explosive Fireball", Journal of Applied Mechanics, May 2013, vol. 80, Issue 3, pp. 031702-1 to 031702-6 (6 pages). (Year: 2013).*
Lazaro et al., "Sensor Calibration Based on Incoherent Optical Fiber Bundles (IOFB) used for Remote Image Transmission", Sensors 2009, vol. 9, pp. 8215-8229 (15 pages). (Year: 2009).*
DeMuynck et al., "Image Transmission through Incoherent Optical Fiber Bundle: Methods for Optimization and image Quality Improvement", WSEAS Transactions on Signal Processing, Issue 9, vol. 4, Sep. 2008, pp. 531-541 (11 pages). (Year: 2008).*
U.S. Appl. No. 16/873,957, filed Aug. 31, 2020, Thermocouple Protection Gauge.
U.S. Appl. No. 16/873,955, filed Aug. 31, 2020, Method for Measuring Blast Field Temperature.

* cited by examiner

*Primary Examiner* — Daniel Petkovsek
(74) *Attorney, Agent, or Firm* — Fredric J. Zimmerman

(57) ABSTRACT

A high-speed imaging system for capturing images of flow created by initiation of energetic material includes a lens collector disposed in a protective shield. The protective shield helps protect the lens collector from damage due to the blast event. The lens connector is connected to an incoherent optical fiber bundle made of a bundle of coherent fiber bundles. The incoherent optical fiber bundle creates scrambled images that are relayed to a high-speed camera. A computer connected to the high-speed camera unscrambles the scrambled images to reproduce the images of the flow.

17 Claims, 5 Drawing Sheets

RUGGEDIZED SYSTEM AND METHOD FOR HIGH-SPEED IMAGING OF EXPLOSIVELY GENERATED FLOW

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The invention relates in general to imaging systems and in particular to high-speed imaging systems for use in destructive testing, explosive fireballs and blast fields.

BACKGROUND OF THE INVENTION

The visualization of the flow structure and moving particles and fragments in an explosively generated flow is an important diagnostic tool. This diagnostic tool is required to analyze explosive performance and validate models that govern multi-phase physics. Typically, a high-speed imaging system is needed to see explosive dynamics with any reasonable time resolution. High-speed imaging generally means imaging from at least 1,000 frames per second up to 1,000,000 frames/per second or more. High-speed imaging systems can be so costly that adequate care must be taken to protect the imaging system against destructive aspects (e.g., fragment and blast) of the explosive testing.

Internal blast testing (inside a blast-proof structure) often has limited options for optical access. For example, blast-proof windows in the structure may not have sufficient size for external line-of-sight imaging, and implementation of imaging internal to the test structure may result in damage or destruction of the imaging equipment. The risk-cost-benefit analysis to implement a costly high-speed imaging system in an internal blast test will almost always dictate that it is better to leave the camera outside of the test facility.

When there is limited optical access in areas such as bombproof chambers and other explosive testing facilities, high-speed imaging diagnostics are not readily used. The lack of high-speed imaging diagnostics makes it difficult to visualize the explosive dynamics in the test chambers. Postmortem techniques (e.g., fragment collection, fragment witness plates) may be used due to the lack of suitable techniques to characterize the dynamic processes in situ. In many cases, the postmortem diagnostics do not adequately capture the flow characteristics as they move and change through the explosive event.

For open field-testing (not internal to a structure), there may be a desire to have high-speed imaging capability in locations where camera systems may be destroyed. For these scenarios, a cost-effective solution to mitigate risk of losing expensive equipment while trying to obtain performance information is also required.

Incoherent optical fibers are sometimes used to transmit images that become scrambled from one end of the fiber to another. Apparatus and methods for unscrambling images are disclosed in conventional related art. Other documents describe methods and apparatus for unscrambling images created by incoherent optical fiber bundles are described in various conventional related art. The related art is expressly incorporated by reference herein.

A need exists for high-speed imaging systems for use in destructive testing and for analysis of explosive fireballs and blast fields for both internal (inside a blast structure) and external (open field) tests.

SUMMARY OF THE INVENTION

In a first aspect, a high-speed imaging system for capturing images of flow created by initiation of energetic material includes a lens collector having one end configured to collect the images of the flow and a second end connected to one end of an incoherent optical fiber bundle. The incoherent optical fiber bundle creates scrambled images from the images of the flow collected by the lens collector. A protective shield has a first hollow cylinder, a second hollow cylinder disposed in and concentric with the first hollow cylinder and a hollow conical cap. The lens collector is disposed in the second hollow cylinder and the hollow conical cap. The incoherent optical fiber bundle includes a plurality of coherent fiber bundles and each coherent fiber bundle includes a plurality of optical fibers. A lens relay is connected to a second end of the optical fiber bundle. A high-speed camera is disposed adjacent to the lens relay to capture the scrambled images of the flow that are transmitted from the incoherent optical fiber bundle to the lens relay. A computer is connected to the high-speed camera. The computer unscrambles the scrambled images to reproduce the images of the flow.

In another aspect, a method of capturing high-speed images of flow created by initiation of energetic material includes providing the system of the first aspect and initiating the energetic material. High-speed images of the flow created by the initiation of the energetic material are captured using the lens collector. The images are transmitted through the incoherent optical fiber bundle to create the scrambled images. The scrambled images are received with the high-speed camera and the computer unscrambles the scrambled images.

The invention will be better understood, and further aspects, objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE INVENTION

Apparatus and methods are disclosed for high-speed imaging of explosive events. The imaging may be used to extract key performance characteristics of the event such as fireball dynamics, particle/fragment velocity, particle/fragment size, and other characteristics that rely on imaging of the explosive event. The apparatus and methods disclosed may offer an enhanced field of view (FOV) compared to a conventional single fiber imaging system.

Figure 1:
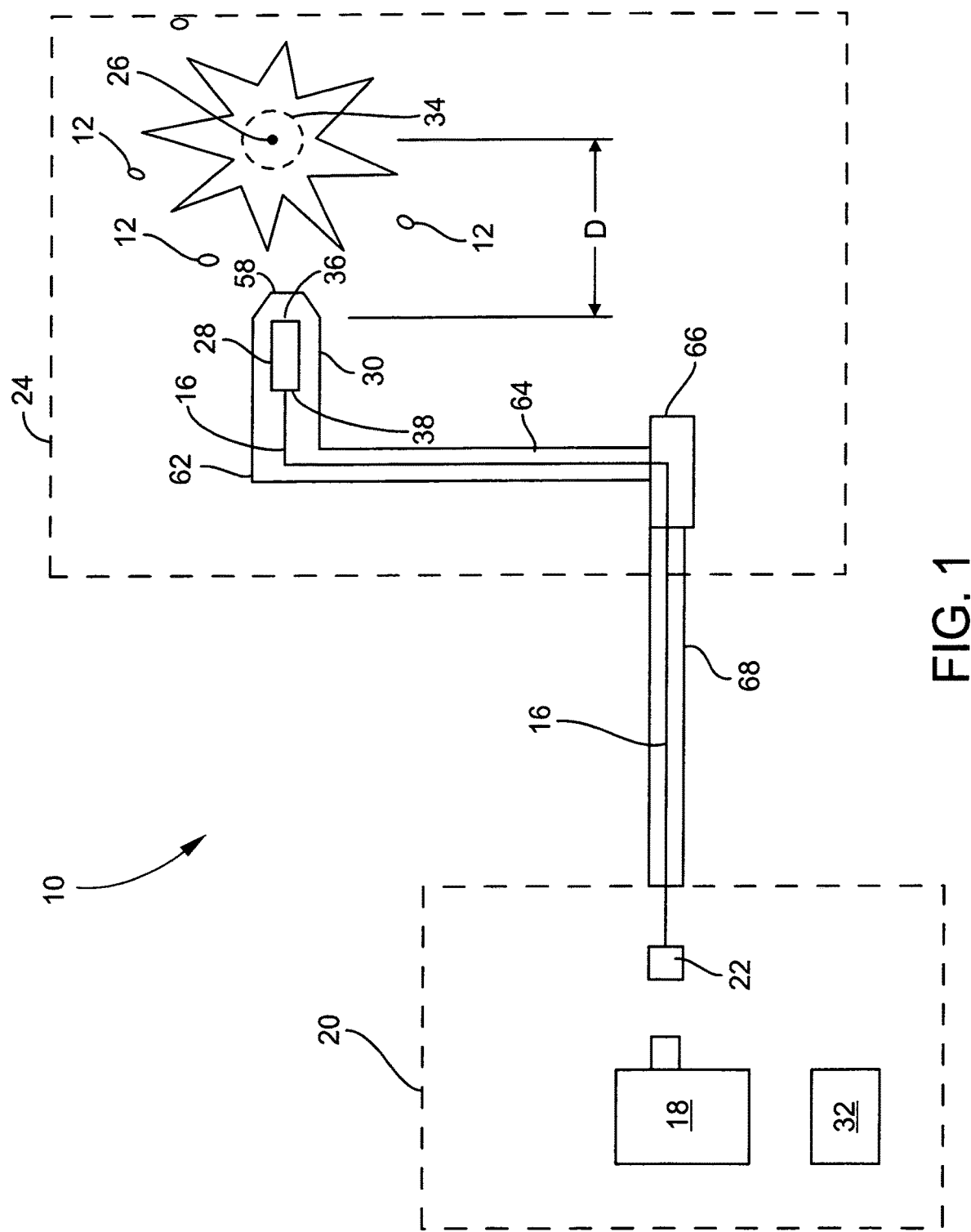
FIG. 1 is a schematic of a high-speed imaging system.

FIG. 1 is a schematic of a high-speed imaging system 10 for capturing images of an explosively generated flow created by initiation of energetic material 26. In some cases, energetic material 26 may be adjacent to an object 34 or enclosed by an object 34, such as a warhead casing, for example. Initiation of energetic material 26 may produce fragments 12 from the object 34 or from other objects. The fragments 12 may be made of metals or other materials.

Figure 2A:
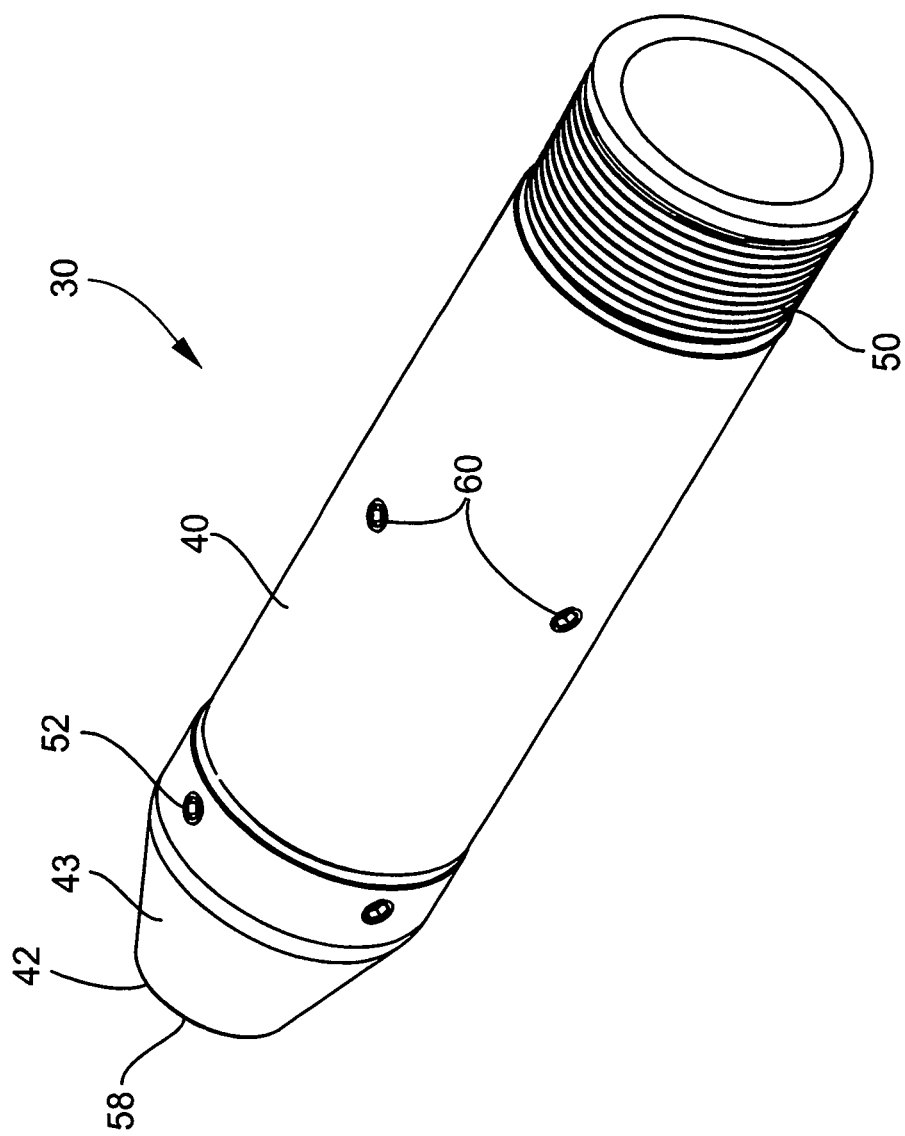
FIG. 2A is a perspective view of a protective shield.
Figure 2B:
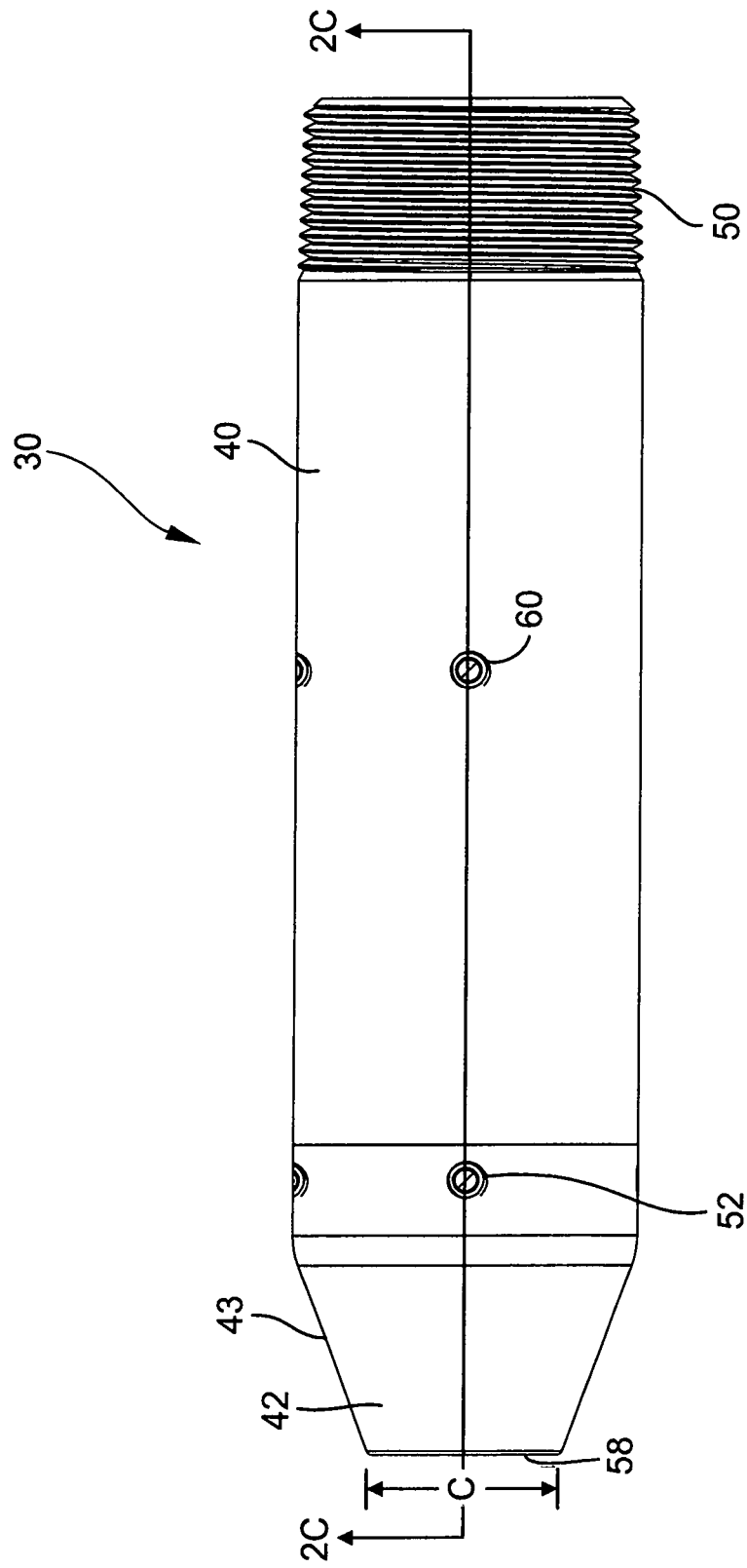
FIG. 2B is an elevation view of the shield of FIG. 2A
Figure 2C:
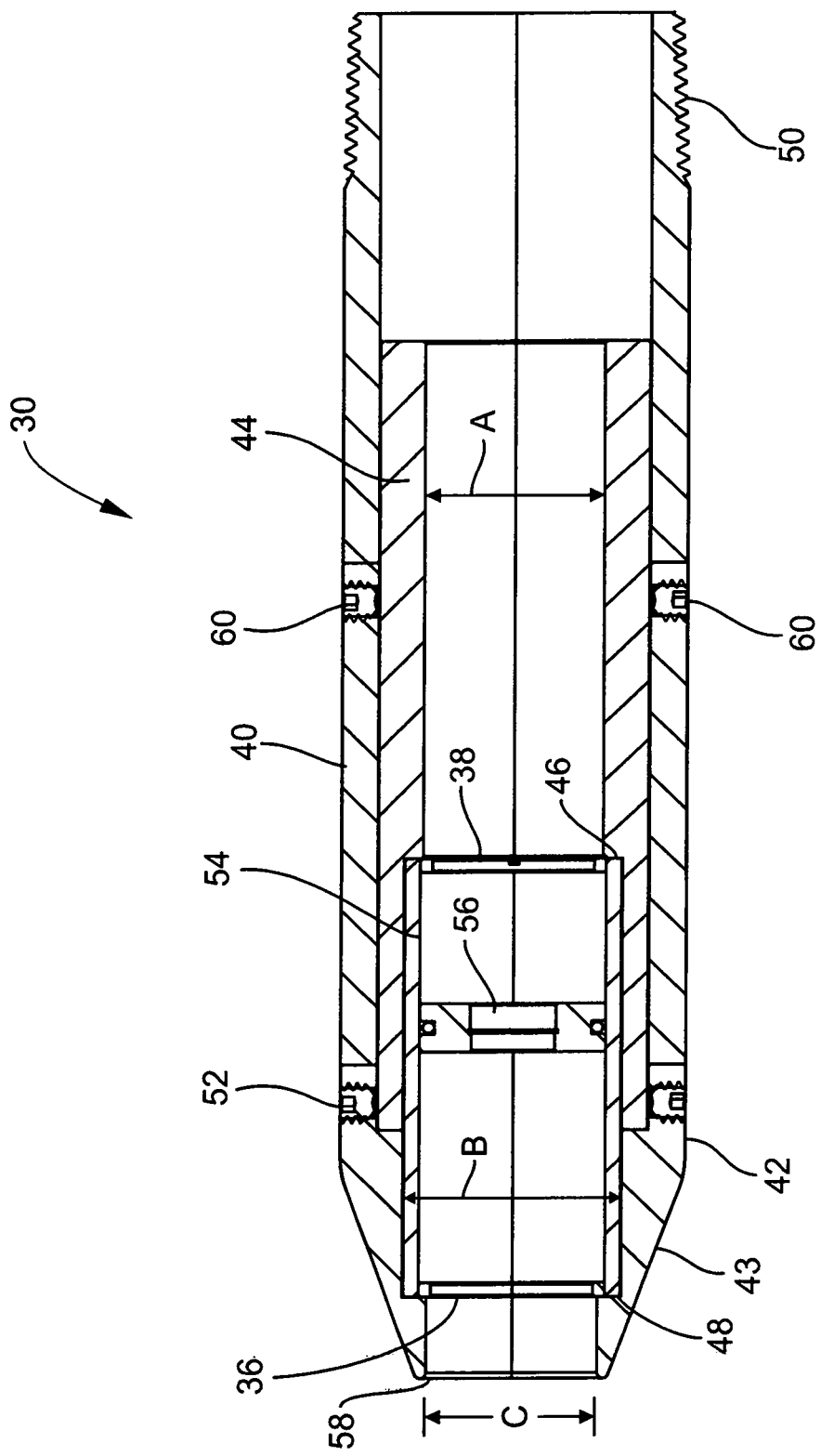
FIG. 2C is a sectional view taken along the line 2C-2C of FIG. 2B.

System 10 may include a lens collector 28 disposed in a protective shield 30. Protective shield 30 (see FIGS. 2A-C) may include a first hollow cylinder 40, a second hollow cylinder 44 disposed in the first hollow cylinder 40 and a hollow conical cap 42 having a conical surface 43. Conical surface 43 may help prevent stagnation of the explosively generated flow in the vicinity of end 36 of lens collector 28. As seen in FIG. 2C, lens collector 28 is disposed in the second hollow cylinder 44 and the hollow conical cap 42. In one embodiment, second hollow cylinder 44 includes a portion of increased internal diameter that defines a circumferential shoulder 46 and conical cap 42 includes a portion of increased internal diameter that defines a circumferential shoulder 48. Lens collector 28 may be disposed in the increased internal diameter portions of cylinder 44 and conical cap 42 so that ends 36, 38 of collector 28 abut shoulders 46 and 48 thereby ensuring a secure fit in shield 30. Conical cap 42 may be fixed to cylinder 44 using, for example, set screws 52.

Second hollow cylinder 44 may be fixed to the inside of first hollow cylinder 40 using, for example, set screws 60. External threads 50 on the end of first hollow cylinder 40 distal from cap 42 allow cylinder 40 to engage internal threads on a piece of pipe, such as elbow 62 (FIG. 1), for example. Elbow 62 may be fixed to a vertical pipe 64 that is fixed to a base 66. Base 66 may be fixed to the floor of a blast-proof structure using known techniques. Alternatively, base 66 may be fixed in place in an open area, such as a field, using known techniques. Cylinders 40, 44 and conical cap 42 may be made of, for example, metals such as steel, stainless steel, aluminum, and others. By way of example only, the inner diameter A of second hollow cylinder 44 may be 1.0 inch, the outer diameter B of lens tube 54 may be 1.2 inches, the diameter C of open end 58 of shield 30 may be 0.95 inches, the inner diameter of cylinder 40 may be 1.5 inches and the outer diameter of cylinder 40 may be 1.9 inches.

Lens collector 28 includes a lens tube 54 and a lens 56 mounted in lens tube 54. An exemplary lens 56 is a small form factor lens assembly, such as Edmund Optics Blue Series M12 imaging lenses. The M12 lens series has a maximal diameter of 18 mm while the threaded portion is set standard at 12 mm. Smaller form factor lenses mean less surface area/cross sectional area exposed to pressure/fragment. Lens 56 needs to cover an effective sensor area. For example, a 0.5 inch format lens will only cover an imaging fiber diameter of 0.5 inch. Lens 56 collects images of the explosively generated flow created by initiation of energetic material 26. In some embodiments, end 36 of lens collector 28 and open end 58 of the protective shield are pointed directly at energetic material 26. Directly pointing the lens collector 28 at the energetic material 26 enables one to capture images of the dynamics of blast, detonation product, and fragments that are produced in realistic weapons test articles, among other test objects. Referring to FIG. 1, the distance D between the lens collector 28 and the energetic material 26 is energetics mass scale dependent, casing dependent, as well as structure dependent.

Figure 3A:
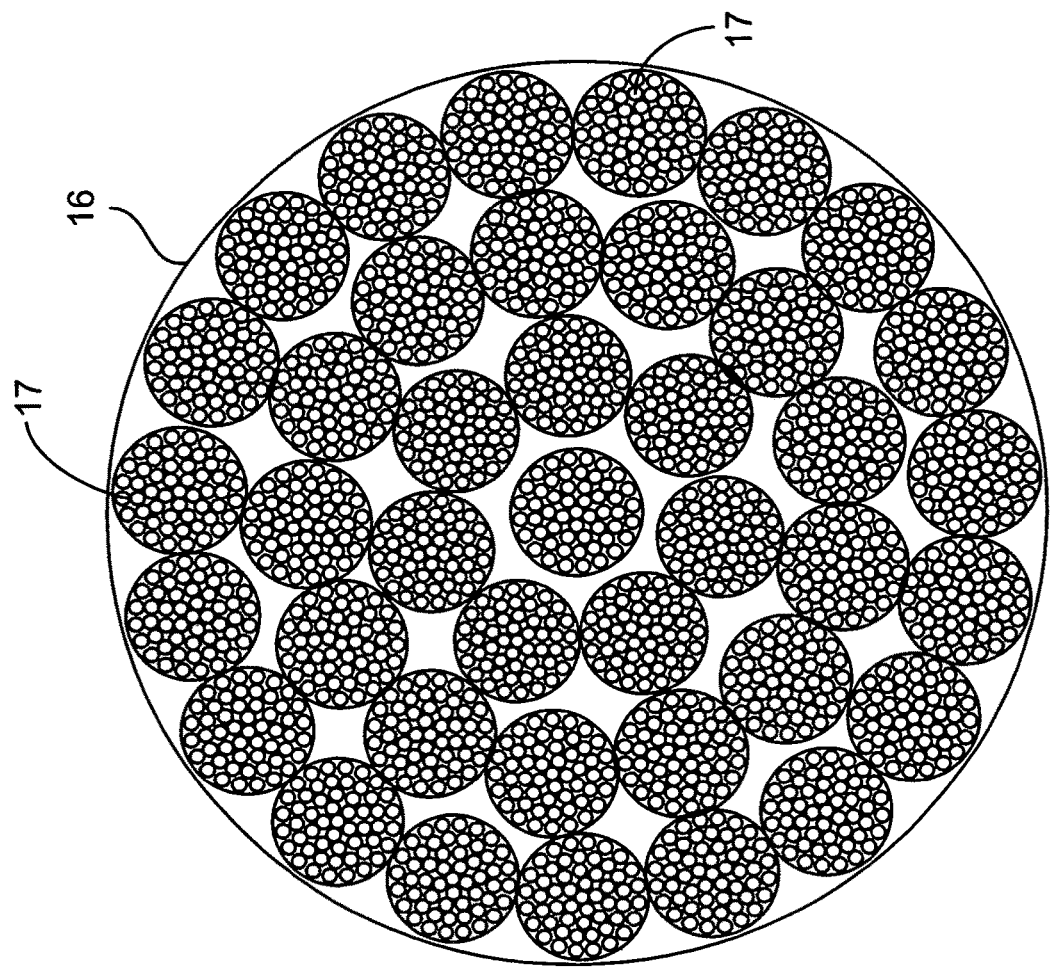
FIG. 3A is a transverse sectional view of an incoherent bundle of coherent optical fiber bundles.
Figure 3B:
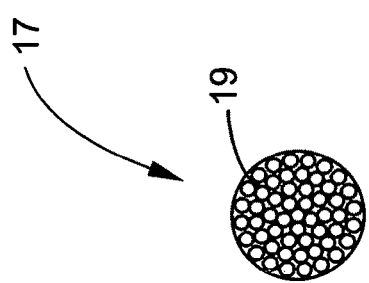
FIG. 3B is a transverse sectional view of a coherent optical fiber bundle.

Referring again to FIG. 1, one end of an incoherent optical fiber bundle 16 is mechanically and optically connected to lens collector 28. As shown in FIGS. 3A and B, incoherent fiber bundle 16 includes a plurality of coherent fiber bundles 17. Each coherent fiber bundle 17 is made of a bundle of individual optical fibers 19. As is known for imaging coherent fiber bundles, the relative spatial orientation of each optical fiber 19 is preserved from one end of the fiber bundle 17 to the other end of the fiber bundle 17. That is, coherent fiber bundle 17 does not scramble the image that is transmitted through the fiber bundle 17. In contrast, the relative spatial orientation of each coherent fiber bundle 17 in incoherent fiber bundle 16 is not preserved from one end of the fiber bundle 16 to the other end of the fiber bundle 16. Thus, the position of each coherent fiber bundle 17 is not the same at each end of incoherent fiber bundle 16. Bundle 16 scrambles the image collected by lens 56.

By way of example only, the number of optical fibers 19 in each coherent fiber bundle 17 may be about 7000 or more. An exemplary number of coherent fiber bundles 17 in the incoherent fiber bundle 16 may be in a range of about 20 to about 29, assuming the diameter of a coherent fiber bundle 17 is about 2 mm. The field of view of the incoherent fiber bundle 16 may be, for example, on the order of about 10 cm to the order of about several meters.

A lens relay 22 is connected to a second end of the incoherent optical fiber bundle 16. The lens relay 22 provides an optical connection between fiber bundle 16 and a chip in high-speed camera 18. High-speed camera 18 is disposed adjacent to lens relay 22 to capture the scrambled images of the explosively generated flow that are transmitted from the lens collector 28 through the incoherent optical fiber bundle 16 and to the lens relay 22.

The use of an incoherent fiber bundle 16 results in the same or a larger field of view (FOV) at lower fiber cost than a comparable FOV of a coherent fiber bundle. Cost of optical fiber is important because all or portions of the fiber bundles may be damaged or destroyed during testing even if the fiber bundle is encased in conduit or protected by other measures. As an example, suppose the minimum focal length f of the lens 56 is 2.8 mm, the diameter d of a commercial off the shelf coherent fiber with 13,000 fibers is 2 mm and the working distance from the lens 56 to the energetic material is D. The maximum FOV of the fiber is (d/f) D or about 0.71 D. A less expensive fiber with the same FOV may be constructed by combining 10 coherent fiber bundles having 1300 fibers each into a single incoherent fiber bundle.

For a fixed working distance D and focal length f, the FOV may be increased by increasing the diameter of a coherent optical fiber bundle. However, larger diameter coherent bundles are relatively expensive, especially when replacement may be required due to damage during testing. So, for comparable fields of view, an incoherent bundle of coherent fibers is less costly than a coherent bundle of fibers. The downside of using an incoherent bundle of coherent bundles is the unscrambling of the images at the camera that must be done to recreate the original image seen by the collection lens.

A computer 32 with a processor is connected to or integral with the high-speed camera 18. The computer 32 unscrambles the scrambled images to reproduce the images of the flow seen by the lens collector 28. A suitable apparatus and method for unscrambling the scrambled images is known from conventional technology.

In some cases, energetic material 26 may be located in and initiated in a blast-proof structure 24 shown in dashed lines in FIG. 1. Blast-proof structure 24 is a type of structure used in conventional testing of energetic material, and structure 24 is designed to withstand and structurally survive the effects of the initiation of energetic material 26 in its interior, as well as any fragmentation that may result. The lens collector 28, protective shield 30, a portion of the incoherent optical fiber bundle 16, and the energetic material 26 may be disposed internal to the blast-proof structure 24. The lens relay 22, high-speed camera 18, computer 32 and a remainder of the incoherent fiber bundle 16 may be disposed external to the blast-proof structure 24. The fiber bundle 16 may be protected with conduit 68 and with additional protective measures, if required.

In some cases, rather than using a blast-proof structure 24 as shown in FIG. 1, energetic material 26 may be located in and initiated in an outside open area, such as a field, for example. In that case the lens collector 28, protective shield 30, a portion of the incoherent fiber bundle 16 and the energetic material 26 are disposed in the open area. The lens relay 22, high-speed camera 18, computer 32 and the remainder of the incoherent fiber bundle 16 are disposed in a location protected from the blast events created by initiation of the energetic material. This location may be in a structure 20 (shown in dashed lines in FIG. 1) or behind a bunker, or in the open area at a far enough distance from the blast event so that the camera 18 is not damaged by the blast event.

Any numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A high-speed imaging system for capturing images of flow created by initiation of energetic material, comprising:
   a lens collector including one end being configured to collect the images of the flow and a second end of the lens collector being connected to a first end of an incoherent optical fiber bundle, wherein the incoherent optical fiber bundle creates scrambled images from the images of the flow collected by the lens collector;
   a protective shield including a first hollow cylinder, a second hollow cylinder being disposed in and concentric with the first hollow cylinder and a hollow conical cap, wherein the lens collector is disposed in the second hollow cylinder and the hollow conical cap,
   where in the incoherent optical fiber bundle includes a plurality of coherent fiber bundles, and wherein each of the plurality of the coherent fiber bundle includes a plurality of optical fibers;
   a lens relay being connected to a second end of the incoherent optical fiber bundle;
   a high-speed camera being disposed adjacent to the lens relay for capturing the scrambled images of the flow that are transmitted from the incoherent optical fiber bundle to the lens relay; and
   a computer being connected to the high-speed camera, wherein the computer unscrambles the scrambled images to reproduce the images of the flow.

2. The system of claim 1, wherein the lens collector, the protective shield, a portion of the incoherent optical fiber bundle, and the energetic material are disposed internal to a blast proof structure, and wherein the lens relay, the high-speed camera, the computer and a remainder of the incoherent fiber bundle are disposed external to the blast proof structure.

3. The system of claim 1, wherein the lens collector, the protective shield, a portion of the incoherent fiber bundle and the energetic material are disposed in an open area, and wherein the lens relay, the high-speed camera, the computer and a remainder of the incoherent fiber bundle are disposed in a location protected from the flow created by initiation of the energetic material.

4. The system of claim 1, wherein the lens collector and an open end of the protective shield are pointed directly at the energetic material.

5. The system of claim 1, wherein a number of optical fibers in each coherent fiber bundle is greater than about 7000.

6. The system of claim 1, wherein a number of coherent fiber bundles in the incoherent fiber bundle is in a range of about 20 to about 29.

7. The system of claim 6, wherein a field of view of the incoherent fiber bundle is from about 10 centimeters to about 20 meters.

8. The system of claim 2, wherein at least the portion of the incoherent fiber bundle disposed internal to the blast proof structure is contained in a protective conduit.

9. The system of claim 3, wherein at least the portion of the incoherent fiber bundle disposed in the open area is contained in a protective conduit.

10. The system of claim 1, wherein the second hollow cylinder includes a portion of increased internal diameter, which defines a circumferential shoulder, wherein the conical cap includes a portion of increased internal diameter that defines a circumferential shoulder, and wherein the lens collector is disposed in the increased internal diameter portions of the second hollow cylinder and the conical cap so that ends of the lens collector abut the shoulders of the second hollow cylinder and the conical cap.

11. The system of claim 1, further comprising a casing for the energetic material producing fragments when the energetic material is initiated.

12. The system of claim 11, wherein the casing comprises a metallic material.

13. A method of capturing high-speed images of flow created by initiation of energetic material, comprising:
    providing the system of claim 1;
    initiating the energetic material;
    capturing high-speed images of the flow being created by the initiation of the energetic material using the lens collector;
    transmitting the images through the incoherent optical fiber bundle for creating the scrambled images;
    receiving the scrambled images with the high-speed camera; and
    unscrambling the scrambled images using the computer.

14. The method of claim 13, wherein the providing step includes placing the lens collector, protective shield and a portion of the incoherent optical fiber bundle inside a blast proof structure and wherein said providing step includes placing the lens relay, high-speed camera, computer and a remainder of the incoherent fiber bundle external to the blast proof structure.

15. The method of claim 13, wherein the providing step includes placing the lens collector, protective shield and a portion of the incoherent fiber bundle in an open area, and wherein the providing step includes placing the lens relay, high-speed camera, computer and a remainder of the incoherent fiber bundle in a location protected from the flow created by initiation of the energetic material.

16. The method of claim 13, further comprising, before initiating the energetic material, aiming the lens collector and an open end of the conical cap directly at the energetic material.

17. The method of claim 13, wherein the step of providing includes providing a metal casing that contains the energetic material.

\* \* \* \* \*